Aug. 28, 1951  W. P. HILGER  2,565,658
FLOOR SANDING EDGER

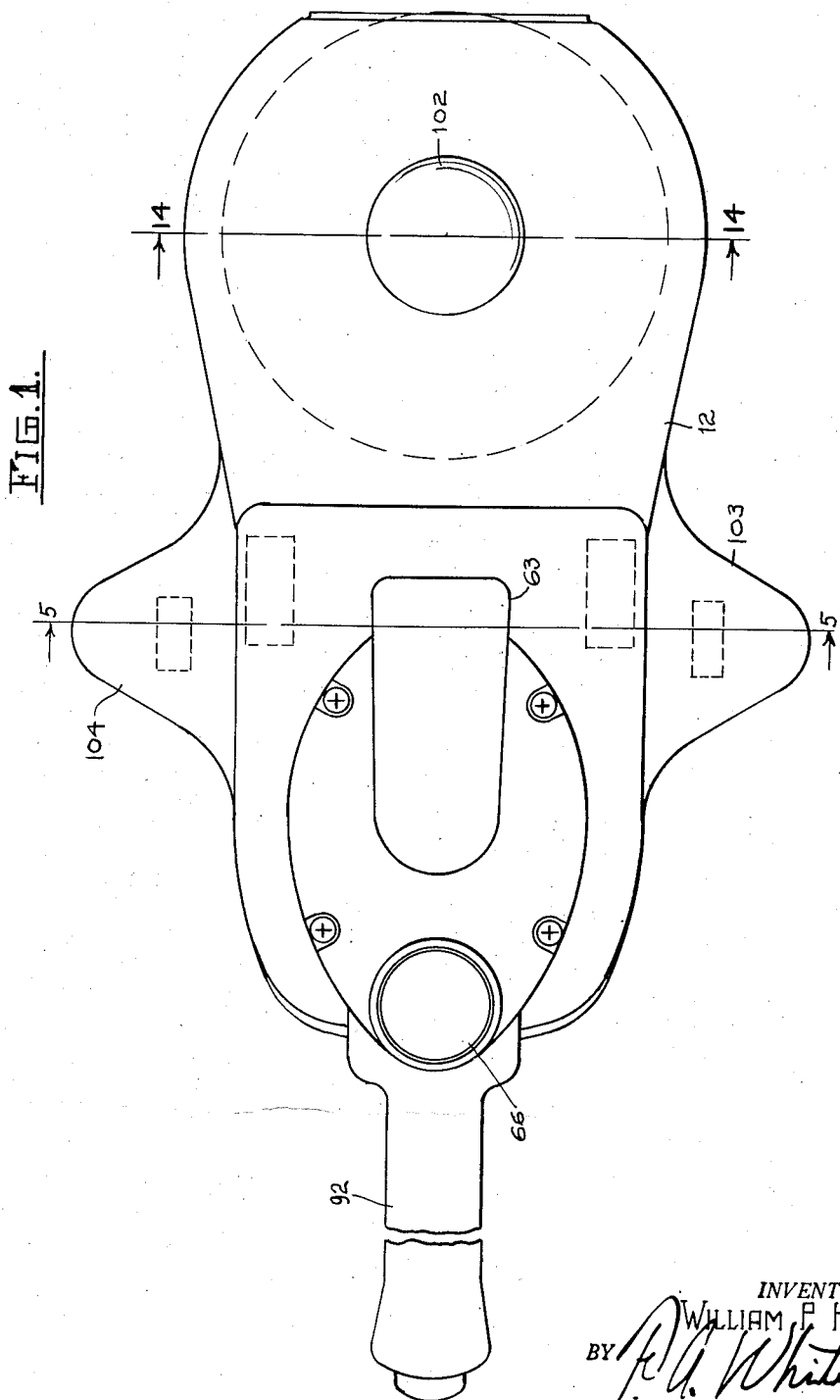

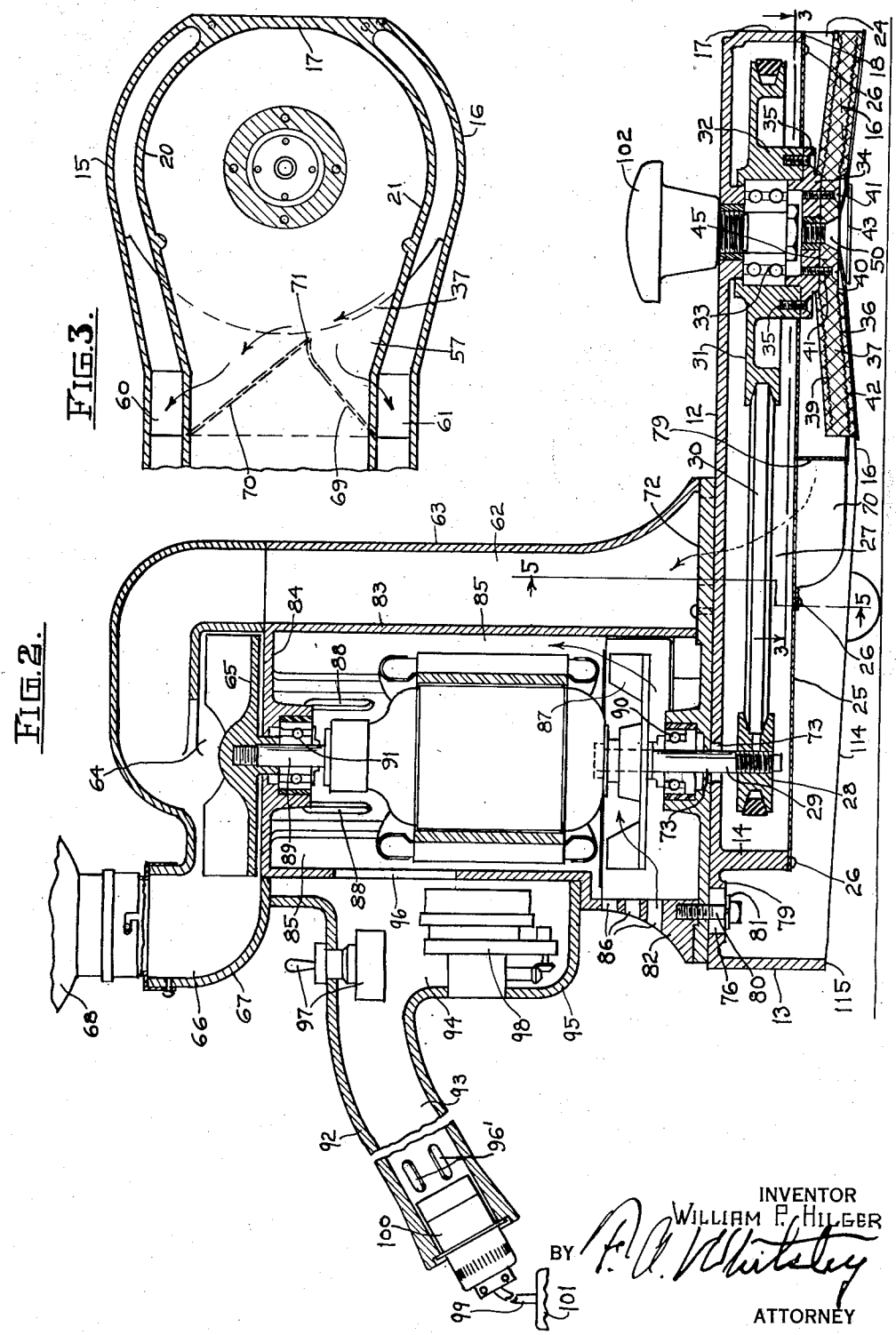

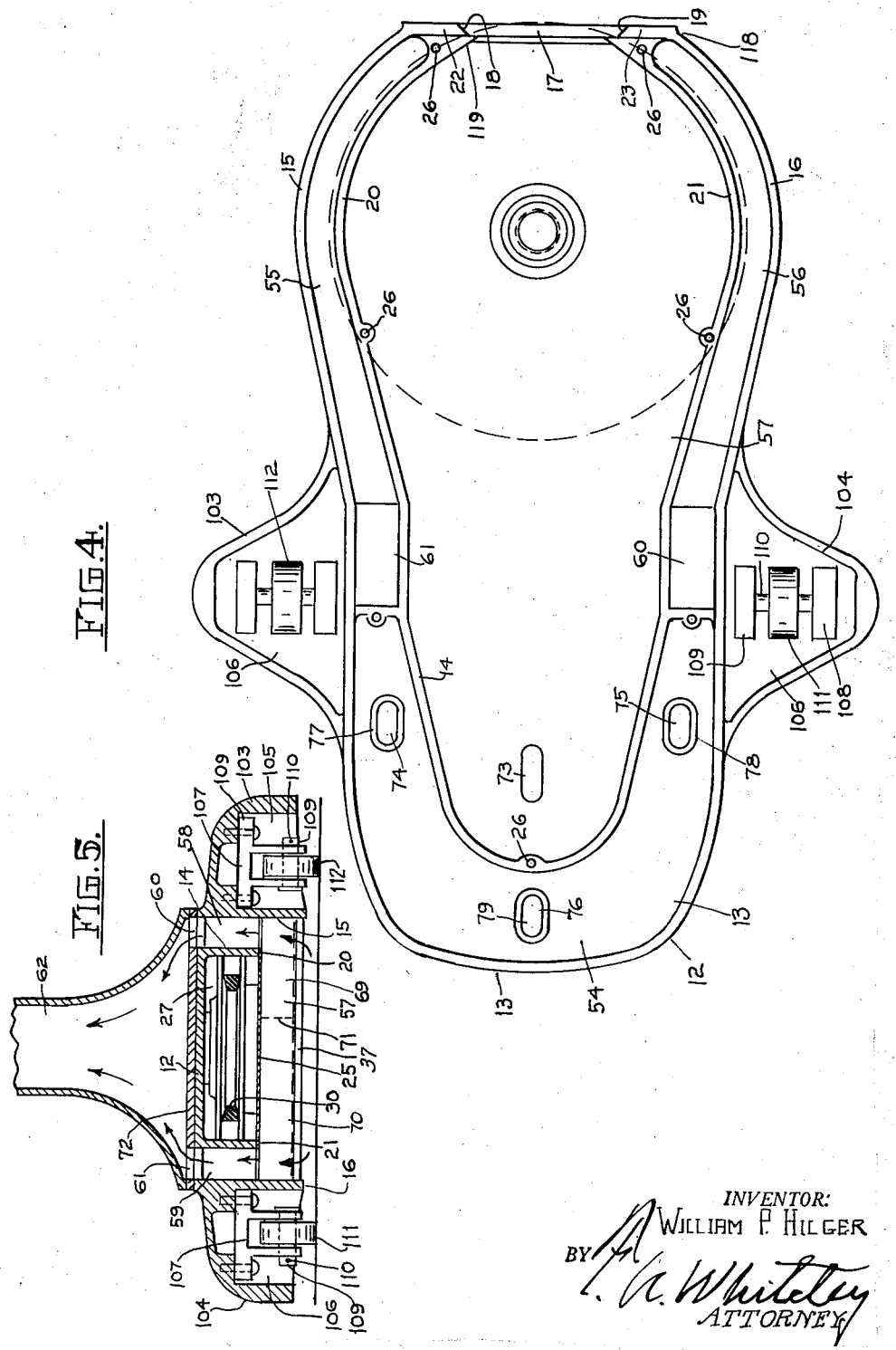

Filed May 23, 1946  6 Sheets-Sheet 4

INVENTOR:
WILLIAM P. HILGER
BY
ATTORNEY

Aug. 28, 1951 W. P. HILGER 2,565,658
FLOOR SANDING EDGER
Filed May 23, 1946 5 Sheets-Sheet 5
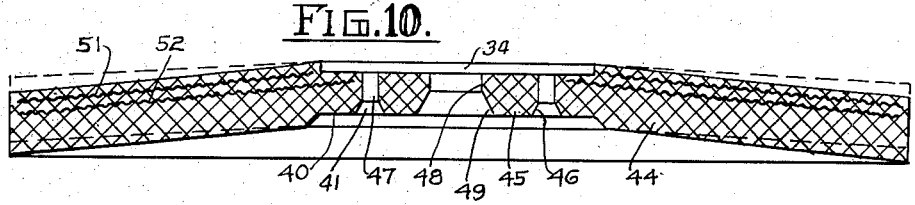
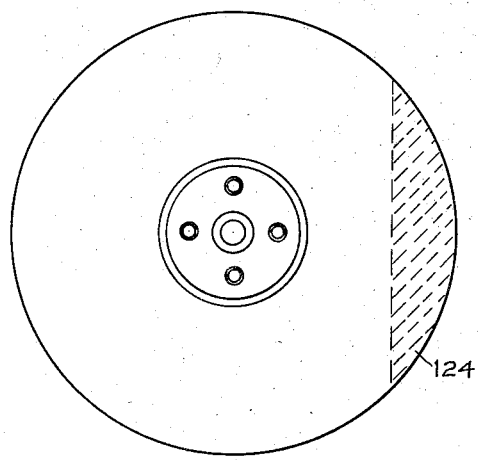
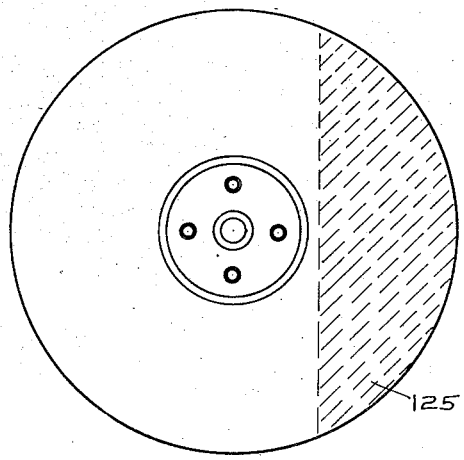
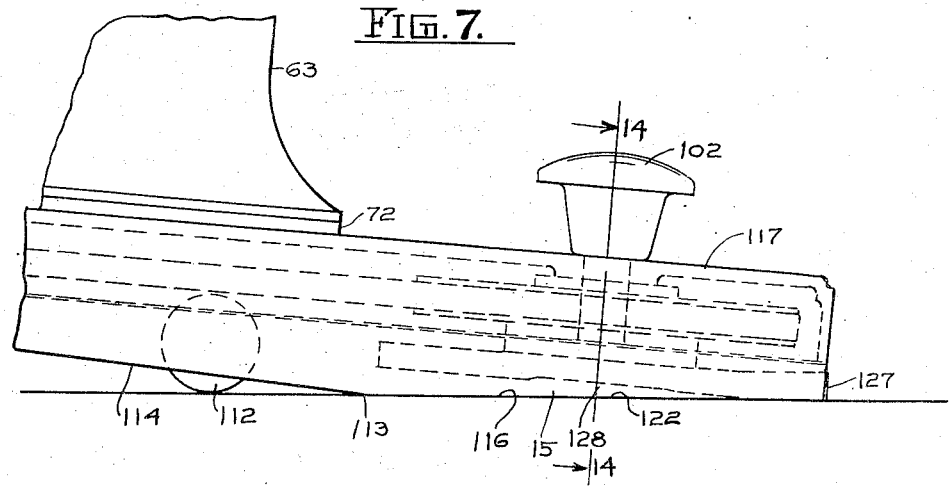
INVENTOR:
WILLIAM P. HILGER
BY
ATTORNEY.

Aug. 28, 1951 W. P. HILGER 2,565,658
FLOOR SANDING EDGER
Filed May 23, 1946 6 Sheets-Sheet 6

INVENTOR.
WILLIAM P. HILGER
BY
ATTORNEY

Patented Aug. 28, 1951

2,565,658

UNITED STATES PATENT OFFICE 2,565,658

FLOOR SANDING EDGER

William P. Hilger, St. Cloud, Minn.

Application May 23, 1946, Serial No. 671,752

2 Claims. (Cl. 51—177)

My invention relates to a floor sanding edger, and has for its object to provide an edger construction employing a novel flexible disk of reinforced rubber which enables the edger to operate fully up to the baseboard molding, at the room corners and elsewhere, and which is so arranged and controlled that neither floor gouging or overloading the motor can take place, together with novel features which add greatly to the usefulness and effective operation of a floor sanding edger.

As is well known, and particularly applicable to better types of floors, such as good hardwood floors, such floors in use, either from wearing or from other causes, become uneven and show wear in spots and in other ways develop surface defects which take away from the beauty and effectiveness of the floor. To remedy these defects what is known as floor sanding has been quite generally practiced. This consists of the application to the surface of the floor of sanding paper usually held upon a rotating drum which may be operated to remove and smooth and polish enough of the floor surface to eliminate the defects and substantially renew the floor.

Although edgers made by me are so constructed that they will operate underneath low objects, such as radiators, such floor sanders and the rotating drums thereon may not always operate clear up to the baseboard or the molding at the bottom of the baseboard, and cannot do so adjacent the room's corners, so when the general sanding operation has been completed there are margins of unsanded floor adjacent the baseboard and its moldings. It is the function of floor sanding edgers, so called, to effect a sanding operation on this unsanded margin to make it uniform with the theretofore sanded portions of the main floor.

Different types of floor sanding edgers have been devised having the purpose of bringing the operative part of the floor sanding member directly up to any part of the baseboard molding. This is done by a disk of sandpaper usually referred to as a sanding disk which is supported by some kind of a member back of it which may be referred to as an edger disk, or if of the type which I employ, as an edger pad. Such edger pads have, however, curled away at their edges so as not to make a good sanding operation close to the molding. To prevent this, stiffening material in the form of steel plates has been employed to back up and support the disks.

While this may prevent curling of the edge of the disk it allows excessive force to be applied to the disk and to the sanding operation which produces two serious defects in operation. One of these is that the floor surface being sanded by the edger is scored and gouged and swirl-marked. The other is that the operator may use excessive pressure on the sanding disk, too great for the motor employed, which, in this type of edger, is for that reason frequently caused to burn out.

Another serious difficulty with edgers, as heretofore built and operated, has been inability to remove and collect the dust generated by the sanding disk and to convey it to the dust bag in such a manner that it can not get into the bearings of either the sanding disk or the motor which furnishes the power therefor. This dust includes not only wood particles from the floor but hard particles from the sand paper, and has the effect of rapidly wearing out bearings if it is permitted to reach and go into them.

Still another difficulty has been found in the fact that not only has no perfect dust collecting job been effected, but that neither by the dust collecting means, nor by any other means, has there been entirely satisfactory and effective means of cooling the motor, something very important in sanding machines since the motor is loaded and tends to heat unless the heat is in a proper manner removed.

I have discovered simple and effective means to remedy all these defects and difficulties. The means discovered for the sanding operation itself comprises a flexible disk so shaped, mounted and rotated that needed high speed of rotation of the disk will through centrifugal force bring the operative surface of the disk into sanding contact with the floor over a substantial area with sufficient pressure exercised by a uniform yielding centrifugal action to produce a most effective, smooth sanding operation, and yet so it is impossible to exert enough pressure on the disk and floor to injure the floor by scoring or gouging or swirl-marking, or to overload and burn out the light type of motor necessary to be employed in this kind of structure.

Also this disk, preferably dish-shaped, either concave or convex to the floor, is so mounted in relation to the housing for the driving means in the motor and in relation to the dust removal means that all dust is picked up where generated and is carried out of the machine along passages which aid in cooling the motor, and which are so related to the motor bearings and the disk bearing that such dust is effectively excluded therefrom.

It is a primary object of my invention, therefore, to provide a sanding edger with a flexible rotary disk mounted toward the front of the machine and having an operative surface turned toward the floor, which disk is driven at initial high speed, whereby centrifugal force moves the parts of the disk into a substantially horizontal plane, and where contact of the disk with the floor will so slow the speed of the disk that the centrifugal force exerted upon it will be so reduced that it can be moved against the floor with a very substantial area of the front part of the disk in sanding contact therewith.

It is a further object of my invention to provide means such that when sanding contact of the disk has been established a sufficient pressure for most efficient sanding operation may be secured by centrifugal action, together with means preventing said pressure ever becoming excessive and thus preventing scoring the floor or overloading and burning out the motor.

It is a further object of my invention to provide a casing for the sanding edger which is mounted and rocks upon a set of rollers, said casing having a portion forwardly extended and formed with an air-tight housing for the drive means for the disk, said casing being adapted to be tipped downwardly when in operation, whereby the disk carried thereby will first contact the floor at a point near its edge and thereafter will be slowed by friction with the floor so that a considerable area of the front of the disk will engage the floor up to the bottom edge of the base molding, together with means on the casing to prevent excessive pressure of the disk against the floor.

It is a further object of my invention to provide a highly novel sanding disk formed of rubber with nonstretchable reinforcing material within the body of the disk, said disk being dish-shaped, either concave or convex, preferably concave, to the floor.

It is a further object of my invention to provide in said casing an air-tight housing for the driving means for the disk to eliminate possibility of sander dust contacting any of the drive means and bearings for rotating the disk.

It is a further object of my invention to provide means for drawing away the sander dust formed by the sanding edger operation and conducting it to the dust bag which shall convey it in such manner that the motor casing will be partly cooled and yet none of the air carrying said dust or any of the dust can reach the motor chamber or the motor bearings.

It is a further object of my invention to provide an arrangement of the motor in the casing in combination with a blower so that outside air will be drawn into and forced through the motor chamber and be discharged from the chamber and casing back outside the machine, and the motor thus be additionally cooled.

The full objects and advantages of my invention will appear in connection with the detailed description thereof given in the appended specification, and the advantageous results above noted which come from the use of the invention will be particularly pointed out in the claims.

Fig. 1 is a top plan view of the entire machine with the dust collecting bag omitted.

Fig. 2 is a longitudinal sectional elevation view of the machine taken along the top center line thereof.

Fig. 3 is a sectional plan view of the machine taken on line 3—3 of Fig. 2.

Fig. 4 is a bottom plan view of the machine viewed upwardly with the sanding disk omitted.

Fig. 5 is a transverse sectional view taken through the bottom part of the machine on line 5—5 of Fig. 1 in inverted or machine-supporting position.

Fig. 7 is an enlarged side elevational view of the front end of the machine from the supporting wheels forward, showing the disk in fully operative position when the frame has been pressed down so the front end of it is resting on the floor.

Fig. 8 is a bottom plan view of the sanding edger disk on a reduced scale viewed from below showing in the shaded area the part of the disk which first contacts the surface while running at an initial high speed.

Fig. 9 is a similar view on a similarly reduced scale showing the sanding disk when the same has been pressed down into full operative position and slowed down as a result, and showing by the shaded area the much larger area contacted by the active surface of the sanding edger disk.

Fig. 10 is a full size sectional view of one form of sanding edger disk.

Figure 6:
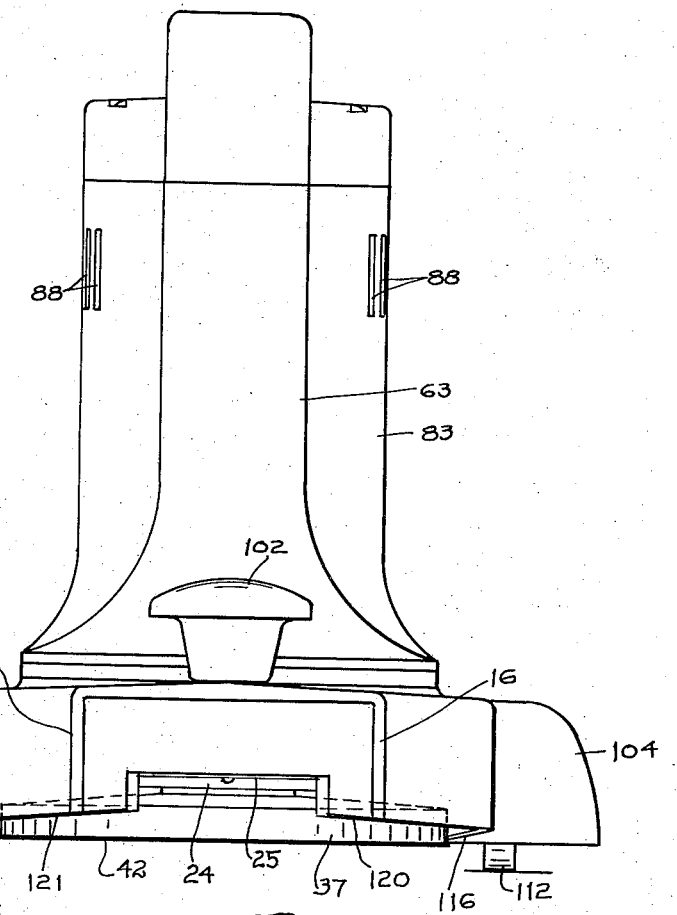
Fig. 6 is a front elevation of the machine as seen from the right hand side of Fig. 5.

As shown, a base member 12 is provided with an outer depending flange 13 and an inner depending flange 14, Figs. 2 and 5. The flange 13 has a front portion at each side, designated respectively as 15 and 16, that is united to a transverse part 17, which has its edge cut away, as clearly shown at 18 and 19 in Figs. 2 and 4. The inner flange 14 has forwardly extended legs 20 and 21, which meet extensions 22 and 23 of the outer flange portions 15 and 16. The sanding disk, later to be described, therefore, rotates below the bottom edges of flange portions 20 and 21 and in a forward recess 24, Fig. 6, between the joined ends of outer flange portions 15 and 16 and inner flange portions 20 and 21, as best shown in Fig. 6.

A plate 25, Fig. 2, is secured throughout its extent upon the bottom edges of flange members 14, 20, 21 and 17, and it is secured in air-tight relation to the bottom of said flange members by screws 26. This bottom plate provides a sealed chamber 27 and in this chamber is a V-belt pulley 28 on a vertical motor shaft 29. Pulley 28 has thereon a V-belt 30 which extends about a large V-pulley 31 having a hub 32 which is removably held upon a roller bearing 33 by means of a plate 34 held upon hub 32 by screws 35. The hub 32 is adapted to have removably secured thereto one of a number of different forms of edger sanding disks 36, as clearly shown in Figs. 2, 10, 11 and 14.

A highly important feature of my invention is found in the edger sander disk which is employed in my new sanding edger, and in its means of support and operation. The characteristics of the sander disk are well shown in the sectional views through the same appearing in Figs. 2, 10, 11 and 14.

In all of these different forms the sander disk comprises a body portion of rubber, and reinforcing nonstretchable layers of material vulcanized into said body portion.

In the form of the invention of Fig. 2 the rubber body is designated as 37. In the form of the invention of Fig. 10 the body portion is designated as 44 and in the form of the invention of Figs. 11 and 14 the body portion is designated as 53. The disks or pads themselves, therefore, in this specification will be referred to hereinafter as 37, 44 and 53.

Each of these disks comprises a central portion 45 with a cutaway or socket part 40 for a use hereinafter defined. The central portion in each case is formed with screw openings 46 and 47 for securing the disks 37, 44 or 53 to the plate 34 by means of screws 41 which go through the openings 46 and 47 and thread into the piece 34, and which, as heretofore noted, is in turn secured by screws 35 to the pulley hub 32. Although this is one form of securing these parts together which may be practically employed, we may directly bond the plate 34 to the rubber pad in any of its forms.

In the forms of the invention here shown the body of the disks 37, 44 or 53 dishes or is concave toward the floor surface which is to be engaged by the disk. But I do not wish to be limited to a disk structure which is concave toward the floor, since the principles of my invention may be employed with a disk which is convex toward the floor and under some working conditions it may be desirable to employ such a disk, although, as stated, the dished form concave toward the floor is the preferable form.

The recess or socket 40 in the under side of the central portion 45 of the disk body, whichever form is employed, is adapted to receive the broad head on the threaded bolt 43 which passes through the opening 48, having flaring walls 49, Fig. 6, and which holds upon the face of the disk opposed to the surface of the floor a suitable disk of sandpaper 42, thus replaceably secured to the outer face of the sanding disk or pad. This sandpaper disk 42 will, of course, be held firmly in contact with the floor surface between it and the lower surface of the sanding pad during operation of the machine.

The several disks 37, 44 and 53 differ from each other primarily in the distribution of nonstretchable material imbedded in the rubber of the disk. This material will preferably be certain types of fabric, such as forms of canvas, which resist stretching in all directions.

Figure 14:
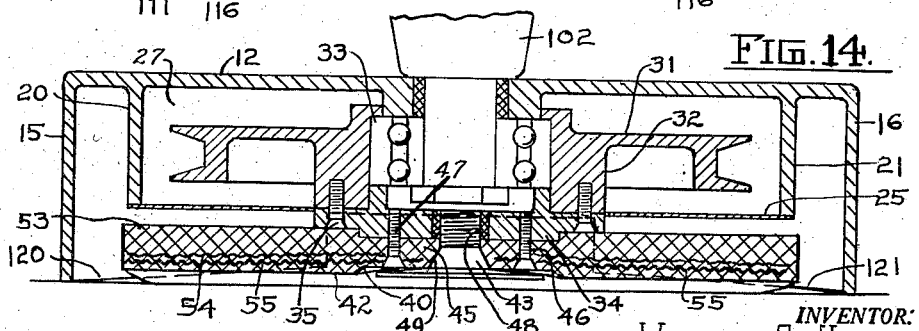
Fig. 14 is a transverse sectional elevation view taken on line 14—14 of Fig. 1 and Fig. 7.
Figure 11:
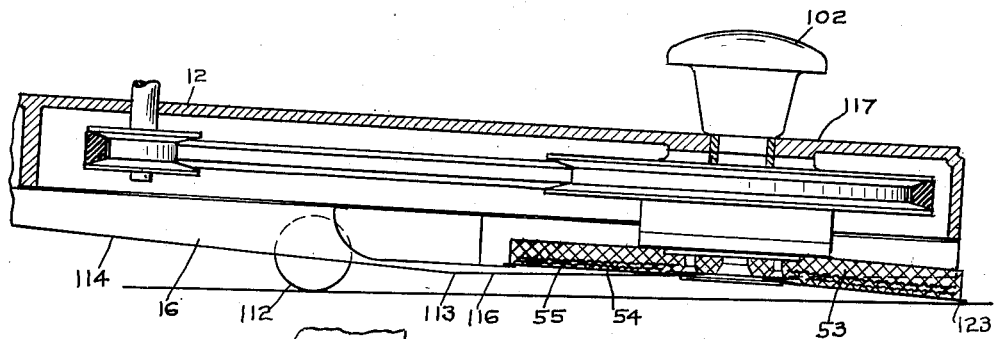
Fig. 11 is a longitudinal sectional elevation of the forward part of the machine below the base plate showing the position of the sanding edger disk when it first contacts the floor when the disk is not running and also showing two layers of fabric running through the disk near its bottom.

In each case as best shown in Figs. 10, 11 and 14, the fabric itself must extend into the central portion 45 of the disk above the socket 40 so that stretching outwardly of the disk when in rotation at high speed will be effectively resisted. In the disk 37 of Fig. 2 the introduction of the nonstretchable material is at both the top and the bottom of the body of the disk as indicated at 38 and 39.

In the form of disk 44 shown in Fig. 10 the nonstretching material is positioned in the upper part of the body of disk 44, as indicated at 51 and 52. In the form of disk shown in Figs. 11 and 14, which may be regarded for many purposes as the preferred form, the nonstretchable material is positioned in the bottom portion of the disk, as indicated at 54 and 55, and, of course, so positioned it has to overlie at its ends outer parts of the socket 40.

These three edger sanding disks, 37, 44 and 53, therefore differ only in the distribution of reinforcing material in the respective disk bodies. This difference in positioning the material has an effect upon the manner in which the disk responds to the application thereto of centrifugal force during rapid rotation thereof, but can be satisfactorily employed in any of the designated positions.

As shown in Fig. 4, the bottom frame member flanges 13 and 14 on base member 12 are spaced apart so as to leave a horseshoe-shaped rear channel 54. Between them are forward side channels 55 and 56 which extend around the forward parts of the flanges to the front end plate 17.

These channels or passageways extend downwardly into a chamber 57 which extends across the bottom casting between the flanges 15 and 16, as shown in Fig. 5.

The broad passageway 57 is open to the floor when the machine is in operation and extends forwardly to the sander disk 37 in position to receive directly the sander, dust removed from the floor and from the sanding paper. The chamber 57 opens directly to passageways 58 and 59, Fig. 5, extending upwardly between flanges 20 and 21 on the inside and flanges 15 and 16 on the outer side and discharges through port openings 60 and 61 through the top plate 12, and motor base 72 thereon.

As best shown in Fig. 5, the ports 60 and 61 open into a passageway 62 in a housing 63, Fig. 2, secured to the motor casing, which passageway leads to a blower chamber 64.

A blower 65 operates in blower chamber 64 and draws dust-laden air from off of the floor back of the sander disk 37 and from chamber 57. This dust goes through passageways 58—60 and 59—61 and into and through passageway 62 into the blower 65, from which it is forced through passageway 66 in connecting pipe 67 into the dust collecting bag 68.

In order to distribute the dust-laden air more effectively to passages 60 and 61, I provide a divided baffle comprising a shorter plate 69 and a longer plate 70, Fig. 3. These plates meet at a point 71 and guide the dust-laden air from chamber 57 to the respective passageways through the top plates 12 and 72 and into the exhaust passageway 62.

The arrangement of the divided baffle is such as to equalize the carrying of dust-laden air from the chamber 57 through the two openings 60 and 61 to the discharge pipe 62. The shorter baffle plate 69 catches perhaps a larger part of the heavy throwoff of dust from the sander disk, while the longer baffle plate 70 gathers up the flow from the succeeding longer arc of the sander disk.

This arrangement provides a peculiarly effective means of withdrawing all dust generated by the sanding disk 37 immediately off of the floor, and of transferring it to the dust-collecting bag, since air will be caused to move along the floor toward the openings 60 and 61 as the dust is thrown off from the sanding disk, and no dust is permitted to settle or to go otherwise than to the dust collecting bag 68.

In this connection it will be noted that the bearings 33 for the sander disk, pulleys 28 and 31, and belt 32, are all mounted to operate in the sealed chamber 27. For, although the plate 25 is subject to removal by simply withdrawing screws 26, it is not often removed after the parts are installed and is secured to make the chamber 27 air and dust tight. The belt 30 may become slack and require tightening from time to time. To accomplish this without removing the plate 25 the following means are provided.

A motor base 72 is slidably rested upon the top of base member 12, as best indicated in Figs. 2 and 4. Motor shaft 29 extends through the motor base 72 and through a slot 73 in top base plate 12. Other parallel slots 74, 75 and 76 in top plate 12 are formed with reinforcing rings 77, 78 and 79 about them. Through the slots 74, 75 and 76 extend strong screw bolts 80 provided with washers 81, Fig. 2, for engaging the reinforcing rims 77, 78 and 79. These bolts are threaded through the motor base 72 and into a heavy supporting rim 82 thereon, as shown in Fig. 2.

Hence, to tighten the belt it is only necessary to release the screw bolts 80 extending through the slots 74, 75 and 76 and to push the motor base 72 and the parts carried thereby rearwardly enough to sufficiently tighten the belt 30, after which the bolts may be reset.

The motor casing 83 is sealed air-tight at its bottom to the motor base 72, and is formed integral with the top 84 of the motor chamber. Hence the motor chamber 85 is itself sealed airtight from the dust stream going through the passageway 62 formed by the housing member 63, which is integrally united by casting or otherwise with the motor casing wall 83.

The casing wall 83 is subject to the cooling effect of the stream of dust-laden air in passageway 62 that moves along the motor casing wall 83 and above the top wall 84, which tends to cool the motor chamber 85.

This chamber is additionally cooled by air drawn through openings 86 in the member 82 and caused to move through and be discharged from motor chamber 85 by a fan 87. The air passes out of motor chamber 85 through slots 88 that extend through wall 83, as shown in Figs. 2 and 6.

It will be noted that the fan 87 is mounted on the motor shaft 29 below the motor. Further that the blower 65 is mounted on an extension 89 of the motor shaft above the motor as shown in Fig. 2. The motor bearings 90 and 91, therefore, and the motor chamber 85 itself are thus completely protected from entrance of any of the sander dust.

Thus the motor chamber is effectively cooled both by contact with part of its wall 83 with passageway 62, and by the air forced through the motor chamber by blower 87.

The rear handle 92 of the sander edger is hollow having a passageway through it as indicated at 93 and the passageway 93 expands to a chamber 94 within a casing member 95. The chamber 94 communicates through an opening 96 with the motor chamber 85 and provides a housing for switch means 97 and timing means 98, shown diagrammatically in Fig. 2. The handle 92 is thus aerated and cooled by the air driven through the motor chamber 85, which pulls air through the opening 96 and slits 96' in the handle body, and about plug 100.

Electric current is delivered through a cord 99, which is connected with plug 100 in the outer end of the handle. The cord is connected at its other end with a contact plug 101, Fig. 2.

To the forward extension of base plate 12 is secured a hand knob 102. The handle 92 is rigidly attached, and in the practice of using the sander edger one hand of the operator grasps the handle 92 while the palm of the other hand engages the knob 102 with a degree of force sufficient to hold the sanding disk in firm engagement with the floor. However this engagement with the floor is held down to a minimum which will prevent any scoring of the floor or overloading of the motor, and which is brought about by the following means:

Extensions 103 and 104 on opposite sides of flanges 15 and 16 are clearly shown in edge elevation and in plan in Figs. 1 and 6, and are shown in an under plan view in Figs. 4 and 5. These extensions 103 and 104 form chambers 105 and 106 within each of which is bolted a crossbar 107, clearly shown in Fig. 5. Independent trunnion arms 108 and 109 support a transverse shaft 110 extending across the width of the margin and upon each and over which is mounted rollers 111 and 112 within each of said chambers 105 and 106, and which rollers extend downwardly through the open bottoms of said chambers to contact the floor.

The entire base frame under the base plate 12, and the parts carried thereby is given rocking support in a transverse plane on rollers 111 and 112, which are quite widely spaced (see Fig. 4), with broad bearing surfaces, thus holding the sanding edger to rock about a substantially horizontal axis and insuring presentation of the sanding disk to the floor so as to effect action thereof on the surface of the floor in a plane tipped upwardly from its plane of rotation perpendicular to the sanding disk. The operator with his hand on the knob 102 exercises pressure which is transmitted to the outer limits of the edger sanding disk. However, since this is a flexible member and centrifugal force tends to force it into a plane perpendicular to its axis of rotation, the actual pressure upon the part of the disk which engages the floor is in fact caused by centrifugal action upon a body of the pad and of the sandpaper disk carried thereby.

This action is well shown in Figs. 7, 8, 9, 11, 12 and 13. As shown in Figs. 7, 11, 12 and 13, the lower edges of the outer flange extensions 15 and 16 are bevelled or sloped upwardly from points 113 a short distance in front of the axis of wheel supports 111 and 112. The rear bevelled edge 114 extends back to the lower edge 115 of the rear extension 13 of the entire flange member while the front portion 116 extends forwardly in such relation to the transverse axial support on rollers 111 and 112 that when the front part 117 is rocked upon the axis of the rollers to the maximum extent possible, the edges 116 of the flange member front portions 15 and 16 will engage the floor through its extensions as indicated at 118 and 119, see Fig. 4. This, of course, will be where the bottom portions 120 and 121 of the transverse member also engage the floor.

It follows that no matter how great a pressure the operator may put upon the knob 102, that pressure can not be transmitted to the sanding disk in operation, beyond the amount, as indicated in Fig. 7, where the edge 116 of members 15 and 16 engages with the top surface 122 of the floor. This maximum pressure upon the sanding disk, as so limited, can never be sufficient either to cause the sanding disk to score the floor or to do other to it than give it a smooth sanding finish. It cannot overload and cause burning out of the motor. No matter what pressure the operator applies to the knob 102 the maximum sanding pressure will be only that effected by centrifugal action on the rotating sanding disk.

Figure 12:
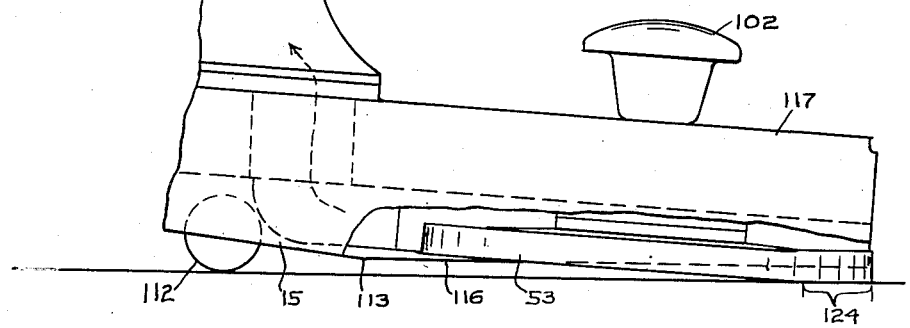
Fig. 12 is a side elevation view of the forward part of the machine showing the disk when running at high speed as its forward edge has made partial contact with the floor surface, as shown in Fig. 7.
Figure 13:
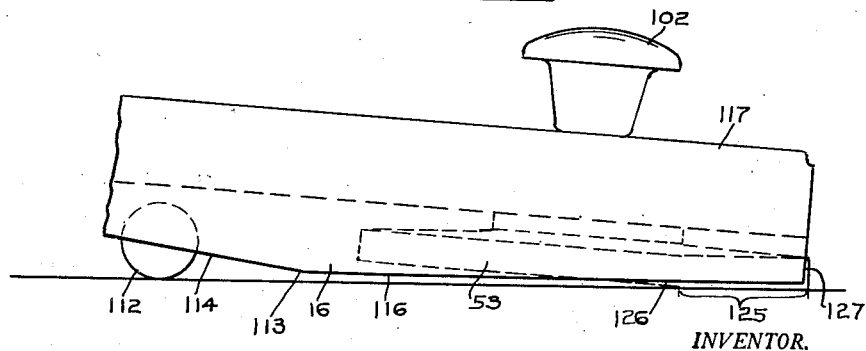
Fig. 13 is a view similar to Fig. 9, showing the position of the disk while full sanding operation is going on with the maximum area of the disk in contact with the floor, as indicated in Fig. 8.

The operation of the sanding disk in its different stages is well shown progressively through Figs. 11, 12 and 13, and in Fig. 7.

The showing in Fig. 11 is of the parts, including the sanding disk, when the power is about to be turned on. In other words this is the position of the sanding disk when stationary and at which time its forward edge at 123 either is rotating entirely free of or so it just touches the floor.

The position of the parts shown in Fig. 12 is taken after the power has been turned on and the sanding disk is rotated at high speed but not under any pressure, or with very little pressure, from the knob 102. In this position, as indicated also diagrammatically in Fig. 6, centrifugal force has brought the dished sanding disk 53 into a position in which its surfaces are rotating in substantially a plane perpendicular to the axis of rotation and the floor is contacted by a small part of the face of the disk, indicated at 124 in Fig. 12, and by the shaded area also designated as 124 in Fig. 8.

In this position friction will have slowed somewhat the rotation of the sanding drum 53 over the initial speed and the sanding operation will have very lightly begun.

In Fig. 13 the sanding operation is illustrated in its normal full sanding speed. Here, pressure has been applied to the knob 102, which has resulted in considerably slowing the rate or rotation of the sanding disk 53. The lower surface edges of the frame are still spaced from the surface of the floor, as indicated at 126, and an area of the sanding disk is engaging the floor with a proper degree of pressure, as indicated by the lines 125 in Fig. 13 and the shaded area also indicated as 125 in Fig. 9.

When in this position the front edge 127 of the sanding disk will project to the line of junction between the lower edge of the molding and the surface of the floor when the sanding edger is brought to that position, and, as it is moved back and forth and laterally, it will operate efficiently to effect a perfect and very accurate sanding and smoothing of the unsanded areas at the edges of the floor adjacent the moldings and in floor corners.

Fig. 7 shows the position of the parts when unnecessary or excessive pressure has been put upon the knob 102. Even if the operator is inexperienced or careless, so excessive pressure is put on the knob, it can not and will not unfavorably affect the sanding operation, for all excess pressure will be exerted against the edges 116, 120 and 121 of the flange members 15 and 16.

Indeed, in the position of either Fig. 7 or Fig. 13, the actual sanding pressure against the floor will be exerted principally by the centrifugal action upon the whirling sanding disk, which tends to straighten the disk and its surfaces into planes extending at right angles to the axis of rotation of the disk indicated at 128, as clearly shown in Figs. 7 and 13.

It follows that not only is the edger sanding operation of this machine independent of lack of experience or carelessness of an operator using the machine, but at all times the pressure exerted upon the floor surface is effected not by a direct pressure thrust, but by the uniform and steady centrifugal floor contacting action of the sanding disk upon the floor surface.

This is the principal and highly important advantage of my invention, since it assures a perfect edger sanding operation flush against the baseboard molding without possibility of injury to the floor or overloading injury to the motor, no matter how inexperienced or careless an operator using the sanding edger may be.

A second principal and highly important advantage of my sanding edger resides in the sanding disk itself. This dished disk of rubber with the reinforcing nonstretchable material in the body of the rubber is in itself a highly advantageous feature of my invention, which makes possible the arrangement of the disk on the bottom frame, whereby the forward edge of the disk is bent out of the plane perpendicular to the axis of rotation of the disk, and that rotation at high speed tends to bring the bent part of the disk into that plane, and produces the principal force exerted by the part of the disk against and which contacts the surface of the floor.

Another highly important advantage of the edger comes from the fact that the dust conveying mechanism not only certainly and effectively removes all dust generated by the action of the sanding disk, but that all moving parts excepting the disk itself, including all bearings, are mounted and housed in such manner that sander dust can not get to them at all.

Another highly important advantage of the invention is that all the driven parts of the machine are operated directly from a single motor shaft with no intervening gearing, with only the direct drive by belt and pulley from the motor shaft itself to the sanding disk, this drive always being along a right line plane normal to the axis of the motor shaft and to the axis of the sanding disk.

Another highly important advantage of my invention resides in the arrangement of passages and the movement of the dust-laden air to the dust cooling bag, whereby some of the heat generated by the motor is withdrawn from the motor chamber, together with the establishment of direct currents of air through the motor chamber and over all parts of the motor to discharge outside the motor casing, thus effecting unusually satisfactory cooling of the motor brought about with small consumption of power.

Other advantages of my invention are found in the compactness, sturdiness, and economy of manufacture of my sanding edger, its relatively light weight, and its small electric power consumption as related to its high efficiency and large capacity.

I claim:

1. A floor sanding edger, comprising a bottom frame having downwardly depending flanges forming an open-bottomed chamber including forward and rear portions, a flexible sanding disk within the forward portion of the chamber rotatably mounted on the frame, a motor on the frame for rotating the sanding disk, and a transverse support for the frame normally holding the flanges out of contact with the work surface, said flanges sloping upwardly from points forward of the support in a plane at an angle to the normal plane of the sanding disk, such that said sloping plane intersects the forward part only of the sanding disk, whereby when in operating the edger the front of the frame is tilted downwardly on the support to contact the sloping part of the flanges with the work surface, the front of the rotating sanding disk will be bent and caused to engage with its bent part said work surface with a maximum pressure effected only by the bending of the flexible sanding disk and centrifugal force tending to straighten said bending.

2. A sanding edger, comprising a base frame, a sanding disk mounted in the frame and positioned at the bottom of its front end, a motor casing on the frame, a vertically supported motor in said casing having the motor shaft extending into position below the motor and outside the casing into position for direct driving connection with the sanding disk, a hollow handle attached to and opening to outside and into said chamber, openings into the chamber toward its bottom and out of the chamber toward its top, and a blower in the casing on the shaft below the motor for drawing outside air into and discharging it from all said openings including the opening into the hollow handle.

WILLIAM P. HILGER.

REFERENCES CITED

The following references are of record in the file of this patent:

UNITED STATES PATENTS

| Number | Name | Date |
| --- | --- | --- |
| Re. 21,180 | Myers | Aug. 22, 1939 |
| 1,650,035 | Peterson | Nov. 22, 1927 |
| 1,725,361 | Mall | Aug. 20, 1929 |
| 1,779,682 | Stratford | Oct. 28, 1930 |
| 2,172,407 | Ramey | Sept. 12, 1939 |
| 2,227,588 | Kemp | Jan. 7, 1941 |
| 2,242,229 | Burleigh | May 20, 1941 |
| 2,251,442 | Emmons | Aug. 5, 1941 |
| 2,281,722 | Smith | May 5, 1942 |